US008645245B2

(12) United States Patent
Ghosh et al.

(10) Patent No.: US 8,645,245 B2
(45) Date of Patent: Feb. 4, 2014

(54) OFFSET OPTIMIZATION SYSTEM

(75) Inventors: Debashis Ghosh, Charlotte, NC (US);
Yanghong Shao, Charlotte, NC (US);
David Joa, Irvine, CA (US); Kurt Newman, Matthews, NC (US);
Sudeshna Banerjee, Waxhaw, NC (US);
Thayer Allison, Charlotte, NC (US);
Arun Pinto, Charlotte, NC (US);
Preston Wesley Ports, III, Charlotte, NC (US); Mark Krein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 380 days.

(21) Appl. No.: 12/847,349

(22) Filed: Jul. 30, 2010

(65) Prior Publication Data

US 2010/0299250 A1 Nov. 25, 2010

Related U.S. Application Data

(63) Continuation of application No. 12/255,000, filed on Oct. 21, 2008, now Pat. No. 7,792,727.

(51) Int. Cl.
*G06Q 40/00* (2012.01)

(52) U.S. Cl.
USPC .............................................. 705/35; 705/39

(58) Field of Classification Search
USPC ....................................................... 705/35, 39
See application file for complete search history.

(56) References Cited

U.S. PATENT DOCUMENTS

| 7,941,371 B1* | 5/2011 | Guinan et al. ................... 705/39 |
| 2003/0187826 A1* | 10/2003 | Kennedy et al. ................... 707/1 |
| 2004/0039667 A1* | 2/2004 | Winklevoss et al. ............ 705/35 |
| 2004/0193537 A1 | 9/2004 | Knapp |
| 2005/0177496 A1* | 8/2005 | Blagg et al. ...................... 705/39 |
| 2006/0293983 A1 | 12/2006 | Rosenblatt et al. |
| 2007/0262137 A1* | 11/2007 | Brown .......................... 235/380 |

OTHER PUBLICATIONS

Citizens Bank of Maryland v. Strumpf (US, Supreme Court, Oct. 1995, pp. 18-20).
International Search Report for PCT/US2009/061173 dated Nov. 24, 2009.

* cited by examiner

*Primary Examiner* — William Rankins
(74) *Attorney, Agent, or Firm* — Michael A. Springs; Moore & Van Allen PLLC; F. Emmett Weindruch

(57) ABSTRACT

Systems, methods, and computer program products are provided for optimizing amounts collected in an offset action where a creditor attaches funds from a debtor's deposits account to satisfy overdue debt payments. In operation, embodiments of the present invention leverage a deposits account's transaction history to detect a deposit pattern for the account and, based on the detected pattern, predict the date of the next large deposit to the attachable account. An offset associate, using the present invention, can then schedule the offset action to occur on the expected date of the next large deposit.

24 Claims, 6 Drawing Sheets

FIG. 1

OFFSET OPTIMIZATION SYSTEM

CROSS-REFERENCE TO RELATED APPLICATION

This application is a continuation of and claims priority from allowed, U.S. patent application Ser. No. 12/255,000, filed on Oct. 21, 2008 now U.S. Pat. No. 7,792,727 and entitled "OFFSET OPTIMIZATION SYSTEM," the entire contents of which are incorporated herein by reference.

FIELD

In general, embodiments of the invention relate to systems, methods, and computer program products for optimizing amounts collected in an offset action where a creditor attaches funds from a debtor's deposits account to satisfy debt obligations.

BACKGROUND

A typical credit-card agreement for a small-business credit-card account grants the card-issuing bank the right to attach—without notice—the credit-card holder's funds held in deposits at the card-issuing bark to pay off credit-card balances that are at least thirty (30) days past due. This is commonly referred to as an "offset action." As used herein, the term "overdue" shall mean at least thirty (30) days past due. An offset action is the last resort for a card-issuing bank in its effort to collect payment towards an overdue credit-card account. When a small-business credit-card account meets the terms for an offset action, it is at the bank's discretion whether and when the offset action will be executed. Notice to the card holder/guarantor is not required before executing the offset action.

When an overdue small-business credit-card account enters the offset-action process, a collection associate at the card-issuing bank searches for the deposits accounts that the small-business credit-card holder/guarantor has in the card-issuing bank. Once the deposits accounts are identified and the offset-action proposal is approved, the next decision to be made is when to execute the offset action. This offset-timing decision is critical to maximize the final amount collected in an offset action because small-business deposits-account balances sometimes shift, either upwards or downwards, dramatically from day-to-day or even from hour-to-hour.

Currently, there are two approaches for offset timing: (1) an upon-approval approach, and (2) the trigger-event approach. In the upon-approval approach, a collection associate can execute an offset action as soon as possible after the offset proposal is approved. For example, a collection associate accesses the overdue card-holder's deposits account and—at no particular time—transfers the available balance or the credit-card overdue amount, whichever is less, to the small-business credit-card account. The collection associate then records the transfer as a payment towards the overdue credit-card balance. Because account-balance fluctuations are common and because the collection associate takes action as a matter of course, not at a strategically scheduled time, a deposits account may be at its loW-balance point when the offset action is taken. Accordingly, the upon-approval approach may miss a lot of funds that could have otherwise been collected and applied as a payment towards the overdue credit-card balance.

In the trigger-event approach, although approval of an offset proposal is required before a collection associate can execute an offset action, approval alone is not enough. The approval must be followed by a trigger event before the offset action can be executed. Accordingly, in this approach, an offset action is triggered upon the occurrence of a trigger event. For example, per the trigger-event approach, after offset approval, the collection associate monitors the day-end account balance of the deposits account on a daily basis and executes an offset action only when the day-end account balance meets or exceeds a certain threshold, e.g. a preset amount or a preset percentage of the overdue credit-card balance.

While this approach is more advanced than the upon-approval approach, as described above, it still commonly results in sub-optimal offset amounts. For example, a sub-optimal offset action occurs when a trigger event triggers an offset action, but, after the trigger event, the credit-card holder withdraws funds before the collection associate has a chance to execute the offset action. Also, for example, per trigger-event approach, an offset action may never occur because the trigger event may never occur. For example, if a deposits-account balance never meets the preset threshold, the offset action is never triggered.

Typically, a bank may only have one chance to execute an offset action because, after the offset action, the overdue consumer may withdraw all remaining funds (if any remain) and terminate its banking relationship with the bank. Accordingly, when executing an offset action, it is desirable to maximize the amount of funds attached in a single offset action. However, when applying known approaches, attaching the maximum amount is difficult because customers' deposits-account balances frequently fluctuate, and it is difficult to time the offset action such that the offset action occurs when the account is at a high-point balance.

SUMMARY

Systems, methods, and computer program products are provided for optimizing amounts collected in an offset action where a creditor attaches funds from a debtor's deposits account to satisfy overdue debt payments. In operation, embodiments of the present invention leverage a deposits account's transaction history to detect a deposit pattern for the deposits account and, based on the detected pattern, predict the date of the next large deposits to the attachable deposits account. A collection associate, using the present invention, can then schedule the offset action to occur on the expected date of the next large deposits. Thus optimizing the amount of funds attached by the offset action.

BRIEF DESCRIPTION OF THE DRAWINGS

Figure 1:
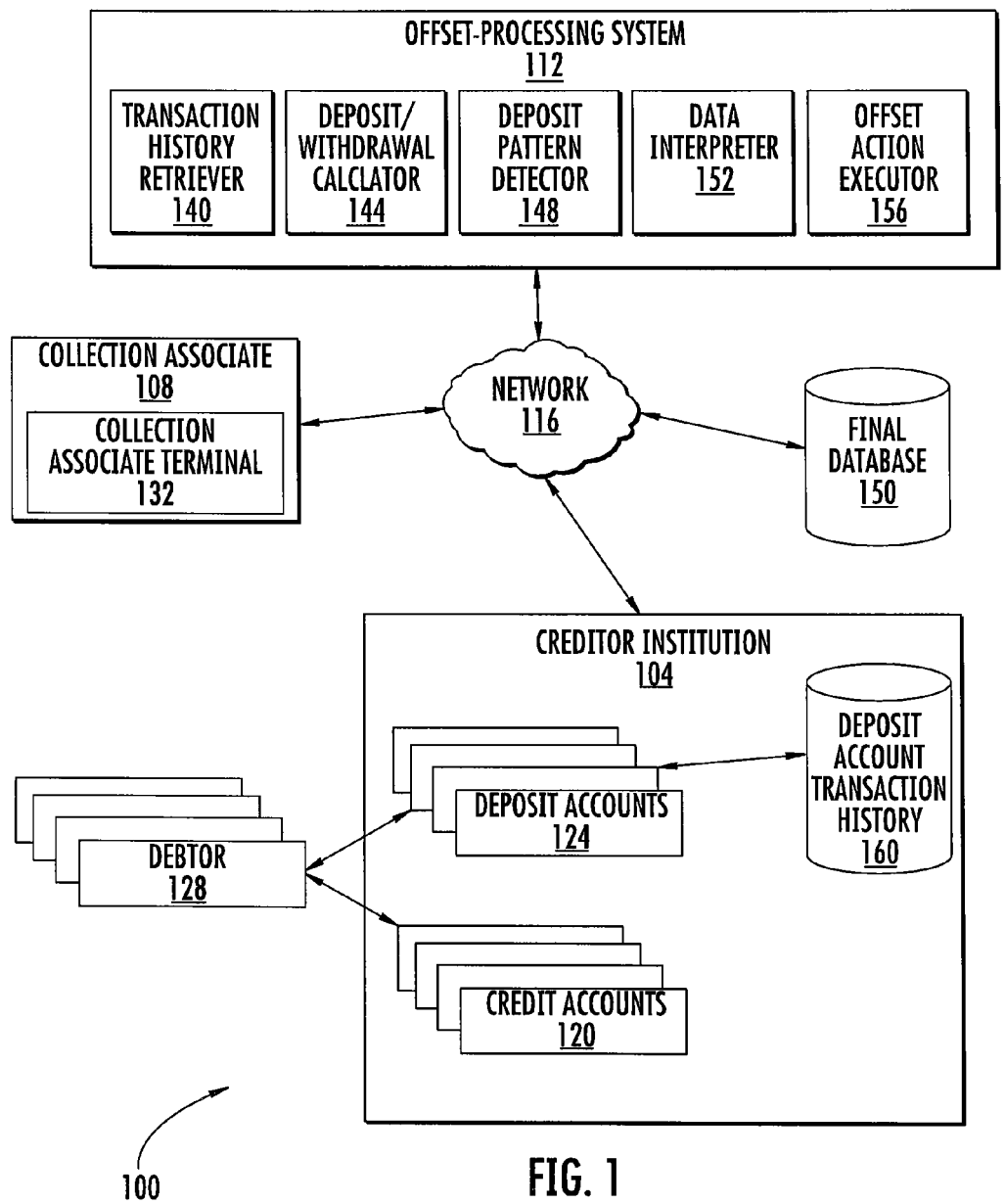
Figure 2:
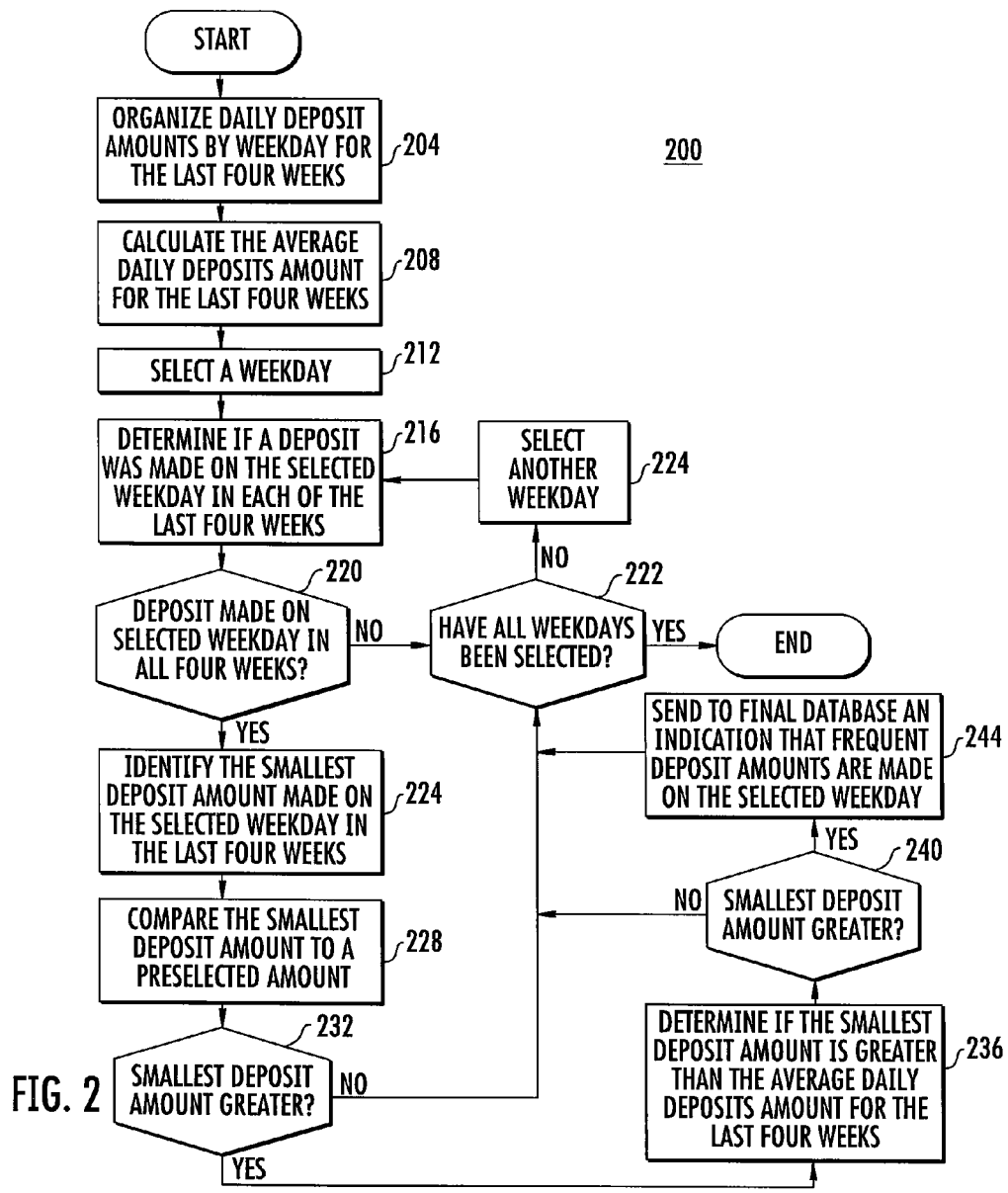
Figure 3:
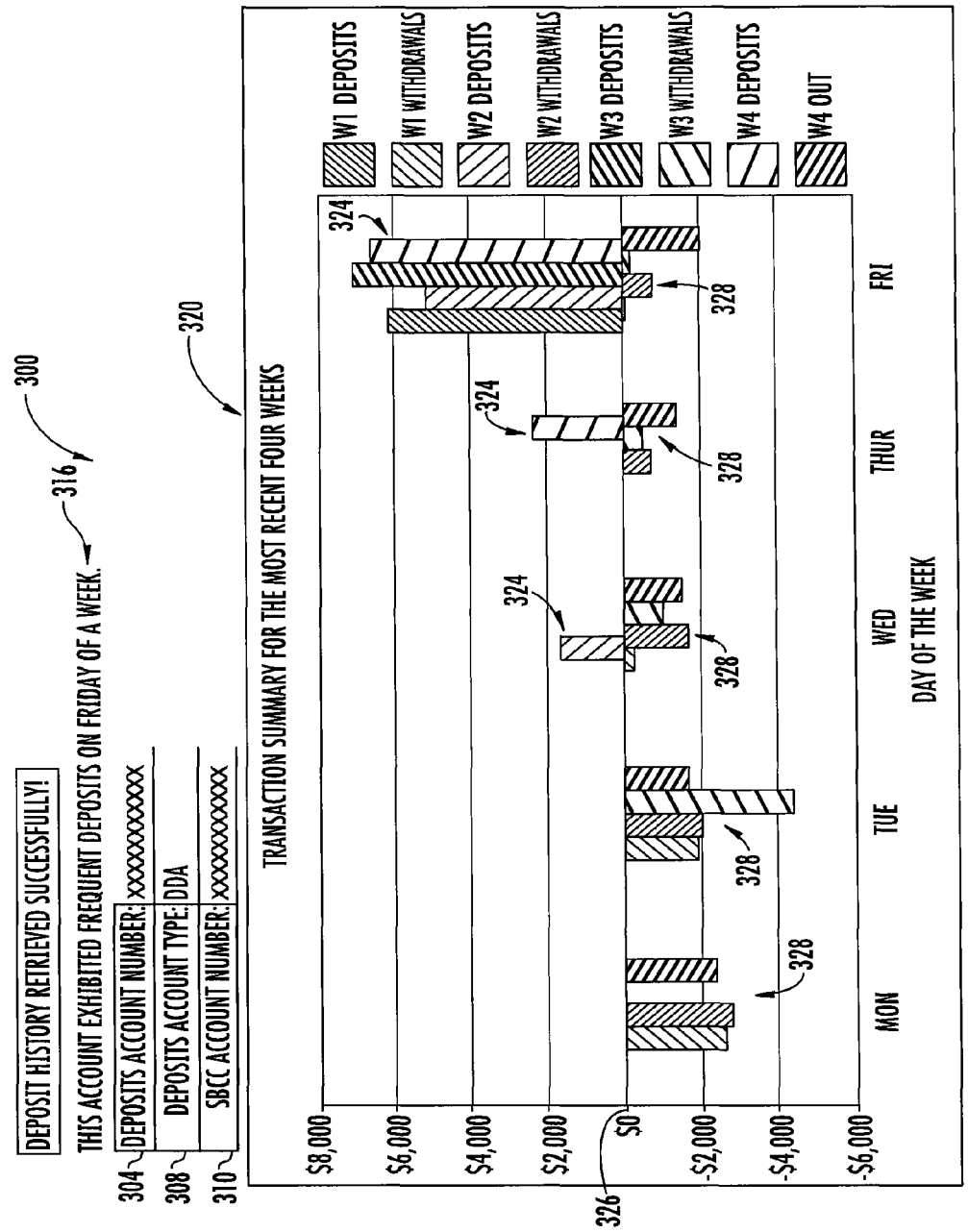
Figure 4:
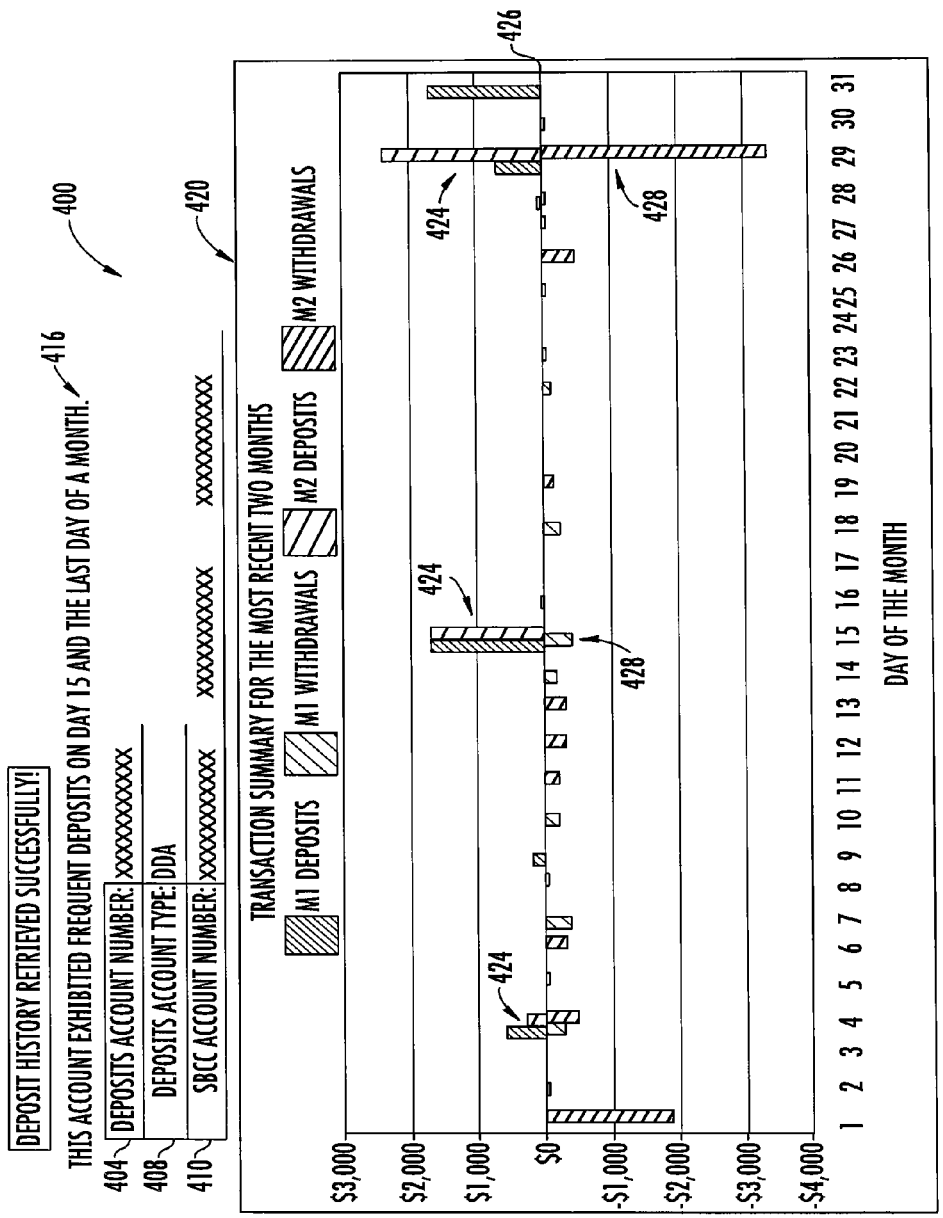
Figure 5:
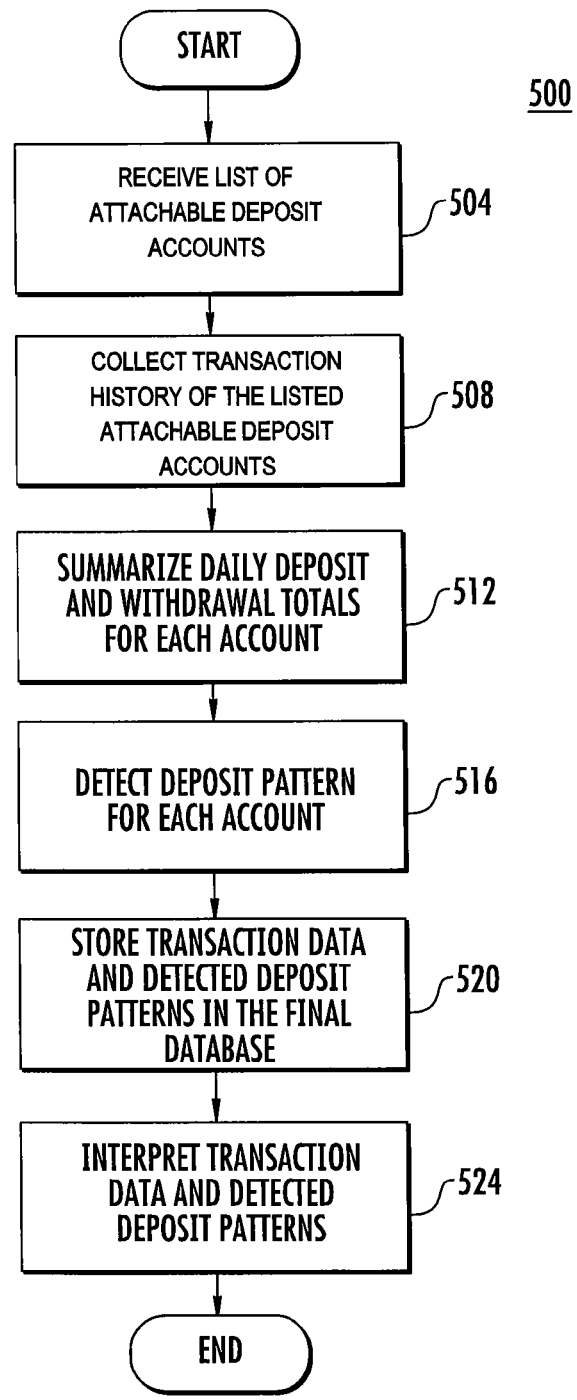
Figure 6:
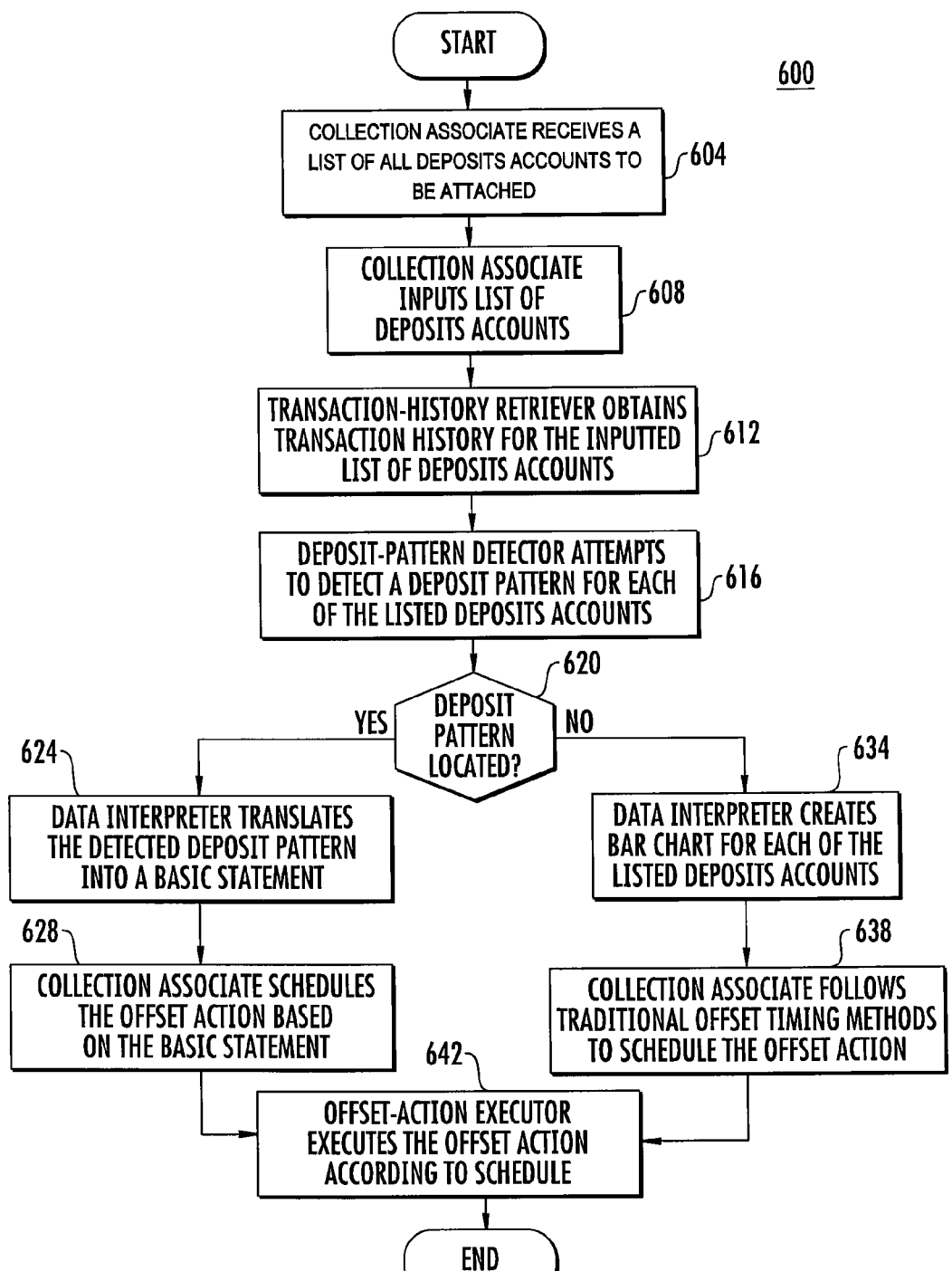

Having thus described embodiments of the invention in general terms, reference will now be made to the accompanying drawings, which are not necessarily drawn to scale, and wherein:

FIG. 1 illustrates an environment in which the processes described herein are implemented according to one embodiment of the invention;

FIG. 2 is a flow chart illustrating an exemplary process of detecting a deposit pattern, according to one embodiment of the present invention;

FIG. 3 is a screenshot illustrating an exemplary output provided by the offset-processing system, according to one embodiment of the present invention;

FIG. 4 is a screenshot illustrating another exemplary output provided by the offset-processing system, according to one embodiment of the present invention;

FIG. 5 is a flow chart illustrating an exemplary process for operating the offset-processing system, according to an embodiment of the present invention; and FIG. 6 is a flow chart illustrating another exemplary process for operating the offset-processing system, according to an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein, unless the claims clearly indicate otherwise; rather, these embodiments are provided so that this disclosure will satisfy applicable legal requirements. Like numbers refer to like elements throughout. It should also be appreciated that, although embodiments of the invention are generally described herein with regard to a bank that holds deposits accounts and issues credit cards, other embodiments of the invention may benefit individuals or business or non-business entities—other than banks—that hold deposits accounts and/or issue credit.

In general, embodiments of the present invention provide systems, methods, and computer program products for optimizing amounts collected in an offset action where a creditor attaches funds from a debtor's deposits account to satisfy overdue debt payments. In operation, embodiment of the present invention leverage a deposits account's transaction history to detect a deposit pattern for the account and, based on the detected pattern, predict the date of the next large deposit to the attachable deposits account. A collection associate, using the present invention, can then schedule the offset action to occur on the expected date of the next large deposit.

FIG. 1 provides a block diagram illustrating an offset-collection system 100, in accordance with one embodiment of the present invention. As illustrated in FIG. 1, the offset-collection system 100 generally comprises a creditor institution 104, a collection associate 108, and an offset-processing system 112, all of which are communicably coupled via a network 116.

In the illustrated embodiment, the creditor institution 104 offers credit accounts 120 and deposits accounts 124 to debtors 128. For illustrative convenience, the creditor institution 104 is described herein as a bank that offers credit-card accounts and deposits accounts to small businesses. Also, for illustrative convenience, all of the credit accounts 120 referred to herein are overdue credit-card accounts and all of the deposits accounts 124 referred to herein have been deemed attachable.

Accordingly, unless otherwise stated, the creditor institution 104 is referred to herein as "the bank 104," credit accounts 120 are referred to herein as "overdue credit-card accounts 120," deposits accounts 124 are referred to herein as "attachable deposits accounts 124," and debtors 128 are referred to herein as "small businesses 128." It should be appreciated, however, that the creditor institution 104 could be any individual or business or non-business entity that provides any known type of credit account 120 and/or deposits account 124 to debtors 128, which can be any individual or business or non-business entity.

In the illustrated embodiment, the bank 104, the collection associate 108, and the offset-processing system 112 are separate entities. The collection associate 108 is a third-party entity that has access to transaction history relating to overdue credit-card accounts 120 and attachable deposits accounts 124 held by the bank 104. The offset-processing system 112 is administered by another third-party entity. In this example, the offset-processing system 112 also has access to transaction history relating to overdue credit-card accounts 120 and attachable deposits accounts 124 held by the bank 104. What's more, the collection associate 108 has access to the offset-processing system 112 such that the collection associate 108 can send and receive information to and from the offset-processing system 112.

It should be appreciated, however, that the collection associate 108 could be part of the bank, and that the offset-processing system 112 can be administered by the bank 104. It should also be appreciated that the offset-processing system 112 and the collection associate 108 could be administered by the same third-party entity.

In operation, according to an embodiment, the collection associate 108 accesses the offset-processing system 112, via the terminal 132 to create bar charts that summarize the transaction history that comprises deposits and withdrawals made to and from attachable deposits accounts 124 and to generate a basic statement that indicates the expected date of the next sizable deposit and/or the date on which frequent deposits are made. Next, the collection associate 108, using the offset-processing system 112, schedules an offset action to occur on the expected date of the next sizable deposit and/or the date on which frequent deposits are made. Instead of, or in addition to scheduling the offset action, the collection associate 108 can use the offset-processing system 112 to execute the offset action.

The illustrated offset-processing system 112 will now be described in more detail. According to the illustrated embodiment, the offset-processing system 112 includes a transaction-history retriever 140, a deposit/withdrawal calculator 144, a deposit-pattern detector 148, a data interpreter 152, and an offset-action executor 156.

The transaction-history retriever 140 accesses a transaction-history database 160, which is maintained and updated by the bank 104, and retrieves transaction history for each of the attachable deposits accounts 124. For example, the transaction history includes deposits data, such as the date and amount of money deposited into the attachable deposits accounts 124. The deposit/withdrawal calculator 144 sifts through the transaction history and calculates the daily total deposits and withdrawal amounts for each of the attachable deposits accounts. Based on the daily total deposits and withdrawal amounts, the deposit/withdrawal calculator calculates a daily net deposit amount.

The deposit-pattern detector 148 analyzes the transaction history retrieved by the transaction-history retriever 140, and, for each of the attachable deposits accounts 124, the deposit-pattern detector 148 detects a deposit pattern. For example, for any given attachable deposits account 124, the deposit-pattern detector 148 may detect frequent and/or large deposits on a particular day(s) of the week and/or month, e.g., a deposit is made on Friday of each week or the last day of each month. The deposit-pattern detector 148 may also detect frequent and/or large deposits on a particular weekday(s) of each month, e.g., a deposit is made on the first Monday of each month.

Referring now to FIG. 2, exemplary operating procedures 200 for the deposit-pattern detector 148 are provided. The exemplary operating procedures 200, when executed by the deposit-pattern detector 148, detect weekly deposit patterns that indicate which weekday(s) receives the most frequent deposits. It should be appreciated however, that operating procedures could be configured to detect deposit pattern other than weekly deposit patterns. For example, procedures could be provided for detecting monthly deposit patterns, which would indicate frequent deposit(s) made on certain day(s) of the month, e.g., the last day of the month. Also for example, procedures could be provided for detecting monthly weekday patterns. These patterns indicate frequent deposit(s) made on certain weekday(s) of each month, e.g., the first Monday of each month.

The exemplary operating procedures 200 instruct the deposit-pattern detector 148 to first review the deposits made on each of the weekdays, and then compare the weekdays to determine which weekday(s) receives the most frequent and/or sizable deposits. As represented by block 204, the exemplary operating procedures 200 instruct the deposit-pattern detector 148 to organize the daily deposits amounts, which are determined by the deposit/withdrawal calculator 144, by weekday for the last four weeks. The exemplary operating procedures 200 instruct the deposit-pattern detector 148 to consider the last four complete weeks of transaction data. However, it should be appreciated that other date-ranges could be considered.

Next, as represented by block 208, the exemplary operating procedures 200 instruct the deposit-pattern detector 148 to calculate the average daily deposit amount for the last four weeks. For example, to do so, the deposit-pattern detector 148 aggregates all of the deposits amounts of the last four weeks and divides that amount by twenty, i.e., the total number of weekdays in a four-week period.

After calculating the average daily deposit amount, the exemplary operating procedures 200, as represented by block 212, instruct the deposit-pattern detector 148 to select a weekday, e.g., Monday, and then, as represented by block 216, review the transaction history for the selected weekday to determine whether a deposit was made to the attachable deposits account 124 on the selected weekday in each of the last four weeks. For example, if Monday is the selected weekday, then the deposit-pattern detector 148 reviews the transaction history of the last four Mondays to determine whether a deposit was made on each of the last four Mondays.

As represented by block 220, if a deposit was not made on each of the weekdays, the operating procedures advance to block 222, where the deposit-pattern detector 148 determines if all of the weekdays, e.g., Monday through Friday, have been selected. If all of the weekdays have not been selected, the deposit-pattern detector 148 advances to block 224 and selects another weekday, e.g., Tuesday. However, if all of the weekdays have been selected for review, the deposit-pattern detector 148 advances to "END."

If, at block 220, the deposit-pattern detector 148 determines that a deposit was made on the selected weekday in each of the last four weeks, then the deposit-pattern detector 148 advances to block 224. Here, the deposit-pattern detector 148 reviews the deposit amounts made on the selected weekday in each of the last four weeks to identify the smallest deposit amount made on the selected weekday.

Then, as represented by block 228, the deposit-pattern detector 148 compares the identified smallest deposit amount to a preselected amount, e.g., $300. Next, at block 232, if the smallest deposit amount is less than the preselected amount, then the deposit-pattern detector 148 returns to block 222. However, as represented by block 232, if the smallest deposit amount is greater than the preselected amount, the deposit-pattern detector 148 advances to block 236. Here, the deposit-pattern detector 148 determines if the identified smallest deposit amount is greater than the average daily deposit amount, which was determined at block 208.

As represented by block 240, if the smallest deposit amount is not greater than the average daily deposits amount, then the deposit-pattern detector 148 returns to block 222. If, at block 240, the smallest deposits amount is greater than the average daily deposits amount, then the deposit-pattern detector 148 advances to block 244. Here, the deposit-pattern detector 148 sends to a final database 150 an indication that the selected weekday is a day when frequent and/or sizable deposits occur and then returns to block 222.

Referring again to FIG. 1, the final database 150 is provided for receiving and storing transaction history from the transaction history retriever 140, daily total deposit and withdrawal amounts from the deposit/withdrawal calculator 144, and detected deposit patterns, such as an indication that frequent and/or sizable deposits are made on a particular day of the week, from the deposit-pattern detector 148. The data interpreter 152 accesses the information stored in the final database 150 and, based thereon, creates bar charts that clearly present the transaction history of each attachable deposits account 124, and the data interpreter 152 translates the detected deposit patterns, which are received from the deposit-pattern detector 148, into a basic statement. Exemplary basic statements are provided below with reference to FIGS. 3 and 4.

FIG. 3 provides an exemplary transaction-summary output 300, which is generated by the data interpreter 152 and presented to the collection associate 108 via the terminal 132. The transaction-summary output 300 provides a summary of deposits and withdrawals that have been made to and from a attachable deposits account 124 in the last four weeks. The transaction-summary output 300 provides an account number 304 and type 308 (e.g., checking or savings) for the attachable deposits account 124 from which the funds are to be attached. An account number 310 for the overdue small business credit card accounts 120, which is to be offset by funds attached from the attachable deposits account 124, is also provided.

A basic statement 316—which, as mentioned above, is a translation of the detected deposit patterns—is included on the exemplary transaction-summary output 300. For example, the basic statement 316 is a translation of the indication that the deposit-pattern detector 148 sent to the final database 150 (see block 244 of FIG. 2). This basic statement 316 is made available to the collection associate 108, so that the collection associate 108 can perform an offset action at a time when frequent and/or sizable deposits are made to the attachable deposits account 124. For example, the illustrated basic statement 316 provides, "This account exhibited frequent deposits on Friday of a week." Accordingly, the collection associate 108 can execute the offset action on a Friday.

The transaction-summary output 300 also provides a bar chart 320 that was created by the data interpreter 152 and that graphically illustrates deposits and withdrawals made to and from an attachable deposits account 124. Bars 324, which extend upward from a horizontal axis 326, indicate deposits made to the attachable deposits account 124 and bars 328, which extend downward from the horizontal axis 326, indicate withdrawals. The bar chart 320 provides side-by-side comparisons of withdrawals/deposits made on corresponding weekdays of the last four weeks. For example, the bar chart 320 compares withdrawals/deposits made on the last four Mondays to each other, withdrawals/deposits made on the last four Tuesdays to each other, etc.

The illustrated bar chart 320 indicates that sizable deposits—relative to the deposits made on other weekdays—were made on each of the last four Fridays. The fact that deposits were made on each of the last four Fridays indicates that deposits are frequently made on Fridays. The bar chart 320 also indicates that relatively small withdrawals are infrequently made on Fridays. What's more, the bar chart 320 indicates that only one sizeable withdrawal was made in the last four weeks. Accordingly, a collection associate 108 can review the bar chart 320 and quickly determine that, because sizable deposits are frequently made on Fridays, Fridays could be ideal days to execute offset actions.

Referring now to FIG. 4, another exemplary transaction-summary output 400 is illustrated. Like the exemplary transaction-summary output 300 of FIG. 3, the exemplary transaction-summary output 400 provides an account number 404 and type 408 for the attachable deposits account 124 and an account number 410 for the overdue small business credit-card account 120.

The exemplary transaction-summary output 400 provides a summary of deposits and withdrawals that have been made to and from an attachable deposits account 124 in the last two months. The two months illustrated in FIG. 4 are January 2008, which has the last day of the month as day 31, and February 2008, which has the last day of the month as day 29. Unlike the exemplary transaction-summary output 300 of FIG. 3, which provides side-by-side comparisons of withdrawals/deposits made on corresponding weekdays of a month, the exemplary transaction-summary output 400 includes a bar chart 420 that shows side-by-side comparisons of withdrawals/deposits made on corresponding days of two months—in chronological order. For example, the first day of one month is compared to the first day of the other month, the second day of one month is compared to the second day of the other month, etc.

Bars 424, which indicate deposits, extend upward from a horizontal axis 426, and bars 428, which indicate withdrawals, extend downward from the horizontal axis 426. The illustrated bar chart 420 indicates that sizable and/or frequent deposits were made on day 15 and last day of the month. Also, a basic statement 416 is provided on the exemplary transaction-summary chart 400 that describes, in plain English, the deposit pattern detected by the deposit-pattern detector 148. The illustrated basic statement 416 states, "This account exhibited frequent and/or sizable deposits on day 15 and the last day of a month."

Taking into consideration all of the information provided from the exemplary transaction-summary output 400, the collection associate 108 determines the appropriate day for executing the offset. The collection associate 108 may execute the offset on day 15 or the last day of the month, which, according to the basic statement 416 and the bar chart 420, are days when frequent and sizable deposits are made to the attachable deposits account 124. The decision of whether to execute the offset on day 15 or the last day of the month, in large part, depends on when the collection associate 108 receives offset approval from the bank 104.

For example, if the collection associate 108 receives offset approval on day 21 of the month, the collection associate 108 could wait and execute the offset action—and thereby attach funds from the attachable deposits account 124—on the last day of the month. In addition to attaching the funds in the offset action, because the bar chart 420 shows a large withdrawal on the last day of one of the months, the collection associate 108 could input, via the terminal 132, an instruction to the bank 104 to allow only one-way transactions—deposits but not withdrawals—for the attachable deposits account 124. This would prevent a withdrawal from occurring before the funds are attached.

Referring again to FIG. 1, when executing an offset action, the collection associate 108 attaches money from the attachable deposits account 124 and then transfers the attached money to the overdue small business credit-card account 120. To execute the offset action, according to the illustrated embodiment, the collection associate 108 accesses the offset-action executor 156 via the terminal 132. The offset-action executor 156 provides the collection associate 108 with access to the attachable deposits account 124, which is held in the bank 104. The collection associate 108, using the offset-action executor 156, then transfers the available balance or the credit-card overdue amount, whichever less, from the attachable deposits account 124 to the overdue small business credit-card account 120.

It should also be appreciated that, instead of actually executing the offset action, the offset-action executor 156 schedules the offset action. For example, a collection associate 108, by way of the offset-action executor 156 instructs the bank 104 to transfer funds from the attachable deposits account 124 to the overdue small business credit-card account 120 on a particular day, which is in the future.

Referring now to FIG. 5, an exemplary process 500 is provided that illustrates operation of an exemplary offset-processing system 112. The offset-processing system 112, when executing the exemplary process 500, obtains and analyzes the transaction history of a attachable deposits account 124, and, based thereon, detects a deposit pattern and indicates to a collection associate 108 the day(s) when deposits are frequently made to the attachable deposits account 124 so that the collection associate 108 can execute an offset action on that day(s).

As represented by block 504, the transaction-history retriever 140 accesses the bank 104 to obtain a list of attachable deposits accounts 124. This list includes checking and savings accounts belonging to small businesses 128 that have overdue small business credit-card accounts 120. In some embodiments, the bank 104 must authorize the offset action before a particular attachable deposits account 124 is included on the list of attachable deposits accounts. It should be appreciated that, instead of the transaction-history retriever 140 retrieving the list of attachable deposits accounts 124, another component of the offset-processing system 112 retrieves the list. It should also be appreciated that the collection associate 108 manually receives the list of attachable deposits accounts 124 from the bank 104.

Next, as represented by block 508, the transaction-history retriever 140 accesses the transaction-history database 160, which is maintained by the bank 104, to retrieve transaction history for each of the listed attachable deposits accounts 124. For example, the transaction history includes a record of all deposits and withdrawals in the most recent months for the attachable checking and savings accounts, including ACH, billpay, checks, teller transactions, ATM, wires, transfers, fees, etc. Then, as represented by block 512, the deposit/withdrawal calculator 144 sifts through the transaction history for each of the attachable deposits accounts 124 and calculates the daily total deposits and withdrawal amounts for each account.

As represented by block 516, the deposit-pattern detector 148 then detects a weekly and/or monthly deposit pattern for each of the attachable deposits accounts 124. Next, as represented by block 520, the transaction-history retriever 140 sends the list of attachable deposits accounts 124 along with the associated transaction histories to the final database 150. Also, as represented by 520, the deposit/withdrawal calculator 144 sends daily total deposits and withdrawal amounts to the final database 150, and the deposit-pattern detector 148 sends detected deposit patterns, such as which weekdays when deposits are frequently made, to the final database 150.

As represented by block 524, the data interpreter 152 accesses the final database 150 to obtain transaction data and detected deposit patterns for the attachable deposits account 124. The data interpreter 152 then interprets the transaction data and the detected deposit patterns. This interpretation is provided, for example, to the collection associate 108 in the form of a basic statement that explains, in plain English, which day(s) deposits are frequently made to the attachable deposits account 124. Also, for example, the interpretation is provided in the form of bar charts that illustrate the deposits and withdrawals made to and from the attachable deposits account 124 over a four-week period. The collection associate 108 then relies on the interpretations provided by the data interpreter 152 when scheduling the offset action for a day on which deposits are frequently made to the attachable deposits account.

Referring now to FIG. 6, another exemplary process 600 is provided that illustrates operation of an exemplary offset-processing system 112. The exemplary process 600 is provided for attaching funds from an attachable deposits account 124 to offset an overdue small business credit-card account 120. In particular, the exemplary process 600 enables a collection associate 108 to maximize the amount of funds attached by scheduling the offset action for a day when deposits are frequently made to the attachable deposits account 124.

As represented by block 604, the collection associate 108 receives a list of attachable deposits accounts 124 that the bank 104 has approved as attachable. For example, these attachable deposits accounts 124 belong to small businesses 128 that have overdue small business credit-card accounts 120 with the bank 104. To determine the optimal time to perform an offset action on the attachable deposits accounts 124, the collection associate 108 accesses the terminal 132 of the offset-collection system 100 and, as represented by block 608, inputs the list of attachable deposits accounts 124.

As represented by block 612, the transaction history retriever 140 accesses the transaction-history database 160 and retrieves transaction history for the listed attachable deposits accounts 124. Next, as represented by block 616, the deposit-pattern detector 148 attempt to detect a deposit pattern for each of the listed attachable deposits accounts 124.

As represented by block 620, if a deposit pattern is detected, the data interpreter 152 translates the detected deposit pattern into a basic statement that indicates the day(s) deposits are frequently made (block 624) and then the collection associate 108 accesses the offset-action executor 156 to schedule the offset action for the day(s) indicated in the basic statement (block 628). Referring again to block 620, if a deposit pattern is not detected, the data interpreter 152 creates bar charts illustrating the deposits and withdrawals (block 634) and the collection associate 108 follows traditional offset time methods—such as the upon-approval approach and the trigger-event approach, which are described above—to schedule the offset action (block 638). As represented by block 642, the offset-action executor 156 then executes the offset action according to the schedule provided by the collection associate 108.

As will be appreciated by one of skill in the art, embodiments of the invention may include a method (including a business process), system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-readable medium may be any medium that can contain, store, communicate, propagate, or transport the program for use by or in connection with the instruction execution system, apparatus, or device. The computer-readable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF) signals, or other mediums.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for determining when to collect funds from an account, the apparatus comprising:
a computer processor configured to:
analyze a transaction history of deposits made to the account;
detect a pattern in the transaction history of deposits;
determine one or more dates and/or times in the future for a user to schedule the collection of funds from the account based at least partially on the pattern in the transaction history of deposits; and
provide the user with a summary of the transaction history of the deposits that indicates the one or more dates and/or times in the future for the user to schedule the collection of funds from the account.

2. The apparatus of claim 1, wherein the computer processor is configured to:
detect the pattern in the transaction history of deposits based at least partially on frequency of deposits; and
determine the one or more dates and/or times in the future to be dates and/or times in the future when it is predicted that a deposit will be made to the account.

3. The apparatus of claim 1, wherein the computer processor is configured to:
detect the pattern in the transaction history of deposits based at least partially on value of the deposits; and
determine the one or more dates and/or times in the future to be dates and/or times in the future when it is predicted that a deposit having a value greater than a particular threshold amount will be made to the account.

4. The apparatus of claim 1, wherein the computer processor is configured to:
detect the pattern in the transaction history of deposits based at least partially on frequency of deposits and the value of deposits; and
determine the one or more dates and/or times in the future to be dates and/or times in the future when it is predicted that a deposit having a value greater than a particular threshold amount will be made to the account.

5. The apparatus of claim 1, wherein the computer processor is configured to:
determine that past deposits are frequently made to the account at recurring dates and/or times; and
determine the one or more dates and/or times in the future to be dates and/or times in the future when it is predicted that a deposit will be made to the account.

6. The apparatus of claim 1, wherein the computer processor is configured to:
calculate a daily total deposit amount for the account; and
detect the pattern in the transaction history of deposits based on the daily total deposit amount.

7. The apparatus of claim 1, wherein the computer processor is configured to:
calculate a daily net deposit amount for the account by considering both deposits and withdrawals made to the account; and
detect the pattern in the transaction history of deposits based on the daily net deposit amount.

8. The apparatus of claim 1, wherein the computer processor is configured to:
determine a day of week or month on which deposits have been made with a frequency greater than a particular threshold amount;
determine a deposit amount based at least partially on deposits made on the day of week or month over a past one or more weeks or months;
calculate an average daily deposit amount for the account over the past one or more weeks or months; and
determine the one or more dates and/or times in the future for a user to schedule the collection of funds from the account based at least partially on a comparison of the deposit amount and the average daily deposit amount.

9. The apparatus of claim 1, wherein the computer processor is configured to:
schedule an automatic collection of funds from the account based at least partially on the summary of the transaction history of deposits.

10. The apparatus of claim 1, wherein the one or more dates and/or times in the future comprises a day of the week, a day of the month, or a particular date.

11. The apparatus of claim 1, wherein the one or more dates and/or times in the future comprises a time of day.

12. The apparatus of claim 1, wherein the computer processor is further configured to:
display a bar chart to a user, the bar chart graphically illustrating deposits and withdrawals made to and from the account and providing a side-by-side comparison of deposits and withdrawals made on corresponding days of the week or days of the month over a plurality of past weeks or months.

13. A method for determining when to collect funds from an account, the method comprising:
analyzing a transaction history of deposits made to the account;
detecting, using a computer processor, a pattern in the transaction history of deposits;
determining one or more dates and/or times in the future for a user to schedule the collection of funds from the account based at least partially on the pattern in the transaction history of deposits; and
providing the user with a summary of the transaction history of deposits that indicates the one or more dates and/or times in the future for the user to schedule the collection of funds from the account.

14. The method of claim 13, further comprising:
  detecting the pattern in the transaction history of deposits based at least partially on frequency of deposits; and
  determining the one or more dates and/or times in the future to be dates and/or times in the future when it is predicted that a deposit will be made to the account.

15. The method of claim 13, further comprising:
  detecting the pattern in the transaction history of deposits based at least partially on frequency of deposits and value of deposits; and
  determining the one or more dates and/or times in the future to be dates and/or times in the future when it is predicted that a deposit having a value greater than a particular threshold amount will be made to the account.

16. The method of claim 13, further comprising:
  determining a day of week on which deposits have been made with a frequency greater than a particular threshold amount;
  determining a deposit amount based at least partially on deposits made on the day of week over a past one or more weeks;
  calculating an average daily deposit amount for the account over the past one or more weeks; and
  determining the one or more dates and/or times in the future to collect funds from the account based at least partially on a comparison of the deposit amount and the average daily deposit amount.

17. The method of claim 13, further comprising:
  determining a day of month on which deposits have been made with a frequency greater than a particular threshold amount;
  determining a deposit amount based at least partially on deposits made on the day of month over a past one or more months;
  calculating an average daily deposit amount for the account over the past one or more months; and
  determining the one or more dates and/or times in the future to collect funds from the account based at least partially on a comparison of the deposit amount and the average daily deposit amount.

18. A computer program product for determining when to collect funds from an account, the computer program product comprising a non-transitory computer-readable medium having computer-readable program instructions stored therein, wherein said computer-readable program instructions comprise:
  first instructions configured for accessing a transaction history of deposits made to the account;
  second instructions configured for detecting a pattern in the transaction history of deposits;
  third instructions configured for determining one or more dates and/or times in the future for a user to schedule the collection of funds from the account based at least partially on the pattern in the transaction history of deposits; and
  fourth instructions configured for providing the user with a summary of the transaction history of deposits that indicates the one or more dates and/or times in the future for the user to schedule the collection of funds from the account.

19. The computer program product of claim 18, further comprising:
  instructions configured for detecting the pattern in the transaction history of deposits based at least partially on frequency of deposits; and
  instructions configured for determining the one or more dates and/or times in the future to be dates and/or times in the future when it is predicted that a deposit will be made to the account.

20. The computer program product of claim 18, further comprising:
  instructions configured for detecting the pattern in the transaction history of deposits based at least partially on frequency of deposits and value of the deposits; and
  instructions configured for determining the one or more dates and/or times in the future to be dates and/or times in the future when it is predicted that a deposit having a value greater than a particular threshold amount will be made to the account.

21. The computer program product of claim 18, further comprising:
  instructions configured for determining a day of week on which deposits have been made with a frequency greater than a particular threshold amount;
  instructions configured for determining a deposit amount based at least partially on deposits made on the day of week over a past one or more weeks;
  instructions configured for calculating an average daily deposit amount for the account over the past one or more weeks; and
  instructions configured for determining the one or more dates and/or times in the future for a user to schedule the collection of funds from the account based at least partially on a comparison of the deposit amount and the average daily deposit amount.

22. The computer program product of claim 18, further comprising:
  instructions configured for determining a day of month on which deposits have been made with a frequency greater than a particular threshold;
  instructions configured for determining a deposit amount based at least partially on deposits made on the day of month over a past one or more months;
  instructions configured for calculating an average daily deposit amount for the account over the past one or more months; and
  instructions configured for determining the one or more dates and/or times in the future to collect funds from the account based at least partially on a comparison of the deposit amount and the average daily deposit amount.

23. The computer program product of claim 18, further comprising:
  instructions configured for initiating collection of funds from the account at the one or more dates and/or times in the future.

24. The computer program product of claim 18, further comprising:
  instructions for displaying a bar chart to a user, the bar chart graphically illustrating deposits and withdrawals made to and from the account and providing a side-by-side comparison of deposits and withdrawals made on corresponding days of the week or days of the month over a plurality of past weeks or months.

* * * * *